(12) United States Patent
Reineke et al.

(10) Patent No.: US 7,415,971 B2
(45) Date of Patent: Aug. 26, 2008

(54) CONTROL CIRCUIT FOR AN ACTUATOR

(75) Inventors: Joerg Reineke, Ditzingen (DE); Armin Wiedergut, Feistritz (AT); Karl Schweiger, Bad Voslau (AT); Karl Farkas, Hennersdorf (AT); Karl-Heinz Schmidt, Oberwart (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/659,564

(22) PCT Filed: Jun. 23, 2005

(86) PCT No.: PCT/EP2005/052927

§ 371 (c)(1),
(2), (4) Date: Nov. 6, 2007

(87) PCT Pub. No.: WO2006/015904

PCT Pub. Date: Feb. 16, 2006

(65) Prior Publication Data

US 2008/0135022 A1 Jun. 12, 2008

(30) Foreign Application Priority Data

Aug. 4, 2004 (DE) .................. 10 2004 037 720

(51) Int. Cl.
  *H01H 47/00* (2006.01)
  *H01F 13/00* (2006.01)
(52) U.S. Cl. .................. 123/490; 361/143; 361/144; 361/146; 361/149

(58) Field of Classification Search .................. 123/490; 361/143, 144, 146, 149
See application file for complete search history.

(56) References Cited

U.S. PATENT DOCUMENTS 5,036,422 A * 7/1991 Uchida et al. ............... 361/159
5,477,831 A   12/1995 Akaki et al.
6,242,845 B1  6/2001 Colombo et al.

(Continued)

FOREIGN PATENT DOCUMENTS

DE  40 11 782  10/1990

(Continued)

OTHER PUBLICATIONS

International Search Report, PCT International Patent Application No. PCT/EP2005/052927, dated Sep. 21, 2005.

(Continued)

*Primary Examiner*—Erick Solis
(74) *Attorney, Agent, or Firm*—Kenyon & Kenyon LLP (57) ABSTRACT

In a control circuit for at least one actuator, in particular for a capacitive actuator of an injection system of an internal combustion engine, a control current can be applied to the actuator.

The control circuit has an inductor, e.g., having a core and having multiple windings, the windings being designed and connected to the control circuit such that a control current flowing into the actuator and a control current flowing out of the actuator each flow through different windings of the inductor, and a magnetic flux induced in the inductor or its core by the control current flowing into the actuator and a magnetic flux induced in the inductor or its core by the control current flowing out of the actuator mutually compensate one another.

9 Claims, 8 Drawing Sheets

U.S. PATENT DOCUMENTS

| | | | |
|---|---|---|---|
| 6,657,845 B2 * | 12/2003 | Kanomata et al. | 361/159 |
| 6,729,277 B2 * | 5/2004 | Yamaki et al. | 123/90.11 |
| 2007/0227494 A1 * | 10/2007 | Cheiky | 123/304 |

FOREIGN PATENT DOCUMENTS

| | | |
|---|---|---|
| EP | 0 611 880 | 8/1994 |
| EP | 1 014 413 | 6/2000 |

OTHER PUBLICATIONS

Written Opinion of the International Search Authority, PCT International Patent Application No. PCT/EP2005/052927, dated Sep. 21, 2005 (English-language translation provided).

* cited by examiner

CONTROL CIRCUIT FOR AN ACTUATOR

FIELD OF THE INVENTION

The present invention relates to a control circuit for at least one actuator, e.g., for a capacitive actuator of an injection system of an internal combustion engine, in which a control current can be applied to the actuator.

Furthermore, the present invention relates to an injection system for an internal combustion engine and to an internal combustion engine.

BACKGROUND INFORMATION

Typical control circuits of the above-mentioned type are used, for example, for activating piezoelectric elements which act on a valve needle of a fuel injector, for example, in order to cause fuel injection into a combustion chamber of the internal combustion engine.

In order to achieve a stroke of the piezoelectric element which is sufficient for activating the valve needle, in conventional systems a control voltage of 160 V or more must be applied, which is typically clocked, in order to achieve controlled opening of the fuel injector and avoid damage to the ceramic of the piezoelectric element. In addition, an inductor is frequently provided in control circuits of this type, which limits the current in the piezoelectric element.

Because of the clocking of the control voltage, a triangular current curve is produced, and during the changes of the control current over time, voltage jumps also occur in supply line inductances of the piezoelectric elements, for example. The high-frequency voltage components accompanying the voltage jumps cause capacitive interference currents in particular, which flow via a housing of the fuel injector into the engine block, for example, and from there via a vehicle body connection back into the control unit, for example.

In this instance, the very low-resistance connection between the engine block, the vehicle body, and the control unit is particularly disadvantageous, due to which, together with the parasitic capacitances and possibly parasitic inductances making the interference currents possible, a high-quality resonance circuit is formed. The resonance frequency of the resonance circuit is determined by the magnitude of the parasitic capacitances and of the inductance of the return line via the engine block and the vehicle body connection. Typical capacitance values for the parasitic capacitances between the connecting lines of the piezoelectric elements and a housing of the fuel injector are, for example, approximately 500 pF to 1 nF, these values being able to vary depending on the arrangement of the piezoelectric elements or the fuel injectors.

The electromagnetic oscillations arising in the resonance circuit result in significant interference, for example, in radio receiver systems of a motor vehicle containing the control circuit or also in further electronic systems. Permissible limiting values for electromagnetic emissions of this type in the engine compartment are often exceeded.

SUMMARY

Example embodiments of the present invention provide a control circuit of the above-mentioned type and an injection system for an internal combustion engine and an internal combustion engine such that the above-described interference currents may be avoided, for example.

According to example embodiments of the present invention, an inductor is provided, e.g., having a core, and having multiple windings, the windings being implemented and connected to the control circuit such that a control current flowing into the actuator and a control current flowing out of the actuator each flow through different windings of the inductor, and a magnetic flux caused in the inductor or its core by the control current flowing in the actuator and a magnetic flux caused in the inductor or its core by the current flowing out of the actuator mutually compensate one another.

Through the mutual compensation of the magnetic fluxes which are caused by the particular control current in the inductor or its core, damping of the control current in the inductor results solely through an ohmic resistance of the coils and a typically negligibly small leakage inductance of the windings.

If asymmetric interference occurs, for example, in the event of an interference current which flows from the actuator to the vehicle body because of parasitic capacitances, for example, the above-mentioned compensation may not occur, since the control current flowing into the actuator and the control current flowing out of the actuator differ in absolute value.

The inductor, having its rated inductance and the high impedance for AC currents resulting therefrom, has a strong damping effect on this differential current between the control currents, which normally compensate one another, because no compensation is possible for the interference current as for the control current.

The winding may be directly connected to a connecting line of the actuator. Interference currents which flow away from the actuator into the vehicle body, for example, are thus damped by the inductor. This arrangement may provide that, for example, capacitive couplings to a vehicle ground, which occur within the control circuit, but not between the winding of the inductor and the actuator, do not result in transient currents, corresponding to the interference currents, through the actuator.

The windings may be directly connected to connecting lines of an output stage provided for activating the actuator. In this configuration, a total control current received by the output stage flows through the particular winding of the inductor, which may be distributed to multiple actuators, for example, depending on the design of the output stage and the activation of the actuators by the output stage. A result therefrom is that, e.g., also if multiple actuators are activated by the output stage, only two windings are required in the inductor.

At least one winding may be connected directly to a connecting line of the actuator, and at least one winding may be connected directly to a connecting line of an output stage provided for activating the actuator.

Thus, for example, capacitive couplings within most of the output stage do not act in the form of transient currents through the actuators in the manner described above. Only those parts of the output stage which are situated between the winding which is connected directly to a connecting line of the output stage and the actuators may, in the event of capacitive extraction of an interference current, for example, also result in corresponding transient currents via the actuators.

The core of the inductor may be designed as a ferrite core.

Further features and aspects of exemplary embodiments of the present invention are explained in the following description with reference to the appended Figures.

DETAILED DESCRIPTION

Figure 5:
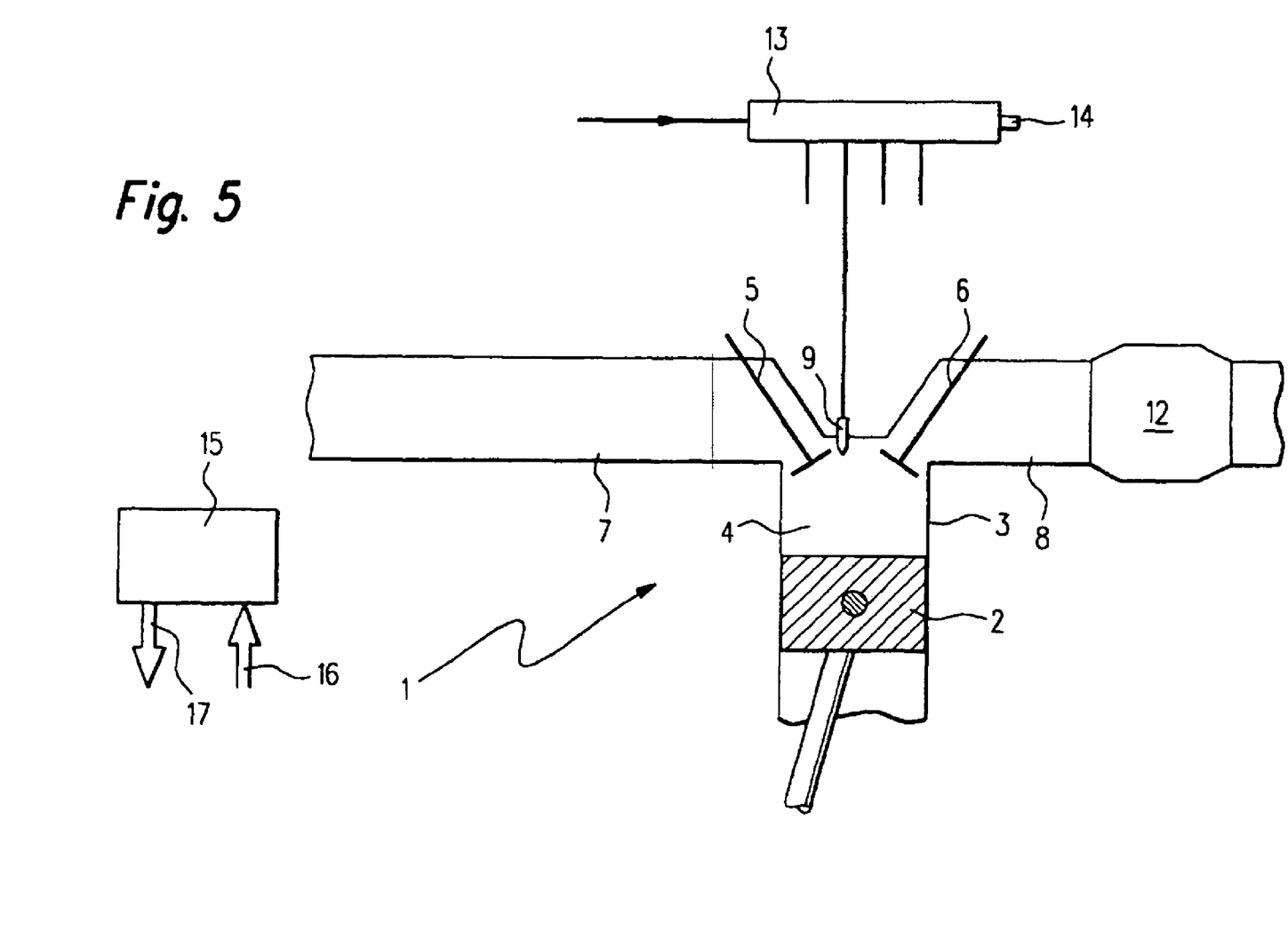
FIG. 5 is a block diagram of an internal combustion engine according to an example embodiment of the present invention.

FIG. 5 illustrates an internal combustion engine 1 of a motor vehicle, in which a piston 2 is movable back and fourth in a cylinder 3. Cylinder 3 is provided with a combustion chamber 4, which, inter alia, is delimited by piston 2, an inlet valve 5, and an exhaust valve 6. An intake manifold 7 is coupled to inlet valve 5 and an exhaust pipe 8 is coupled to exhaust valve 6.

A fuel injector 9, via which fuel may be injected into combustion chamber 4, projects into combustion chamber 4 in the area of inlet valve 5 and exhaust valve 6. A catalyst 12 is housed in exhaust pipe 8, which is used for purifying the exhaust gases resulting due to the combustion of the fuel.

Fuel injector 9 is connected via a high-pressure line to a fuel accumulator 13. In a similar manner, the fuel injectors of the other cylinders of internal combustion engine 1 are also connected to fuel accumulator 13. Fuel accumulator 13 is supplied with fuel via a supply line. A, for example, mechanical, fuel pump is provided for this purpose, which is capable of building up the desired pressure in fuel accumulator 13.

Furthermore, a pressure sensor 14 is situated on fuel accumulator 13, using which the pressure in fuel accumulator 13 is measurable. This pressure is the pressure which is exerted on the fuel, and therefore at which the fuel is injected via fuel injector 9 into combustion chamber 3 of internal combustion engine 1.

During the operation of internal combustion engine 1, fuel is delivered into fuel accumulator 13. This fuel is injected via fuel injectors 9 of individual cylinders 3 into associated combustion chambers 4. By combusting the air/fuel mixture existing in combustion chambers 3, pistons 2 are set into a back-and-forth movement. These movements are transmitted to a crankshaft and exert a torque thereon.

Input signals 16, which represent performance quantities of internal combustion engine 1 measured using sensors, are applied to a control unit 15. For example, control unit 15 is connected to pressure sensor 14, an air mass sensor, a speed sensor, etc. Furthermore, control unit 15 is connected to an accelerator pedal sensor, which produces a signal that indicates the position of an accelerator pedal actuatable by a driver and thus the required torque. Control unit 15 generates output signal 17, using which the behavior of internal combustion engine 1 may be influenced via actuators or final control elements. For example, control unit 15 is connected to fuel injector 9, etc., and produces the signals required for their activation.

Inter alia, control unit 15 is provided for controlling and/or regulating the performance quantities of internal combustion engine 1. For example, the fuel mass injected by fuel injector 9 into combustion chamber 4 is controlled and/or regulated by control unit 15 in particular for low fuel consumption and/or low pollutant production. For this purpose, control unit 15 is provided with a microprocessor, which has a computer program, capable of performing the cited control and/or regulation, stored in a memory medium, e.g., in a flash memory.

Figure 1A:
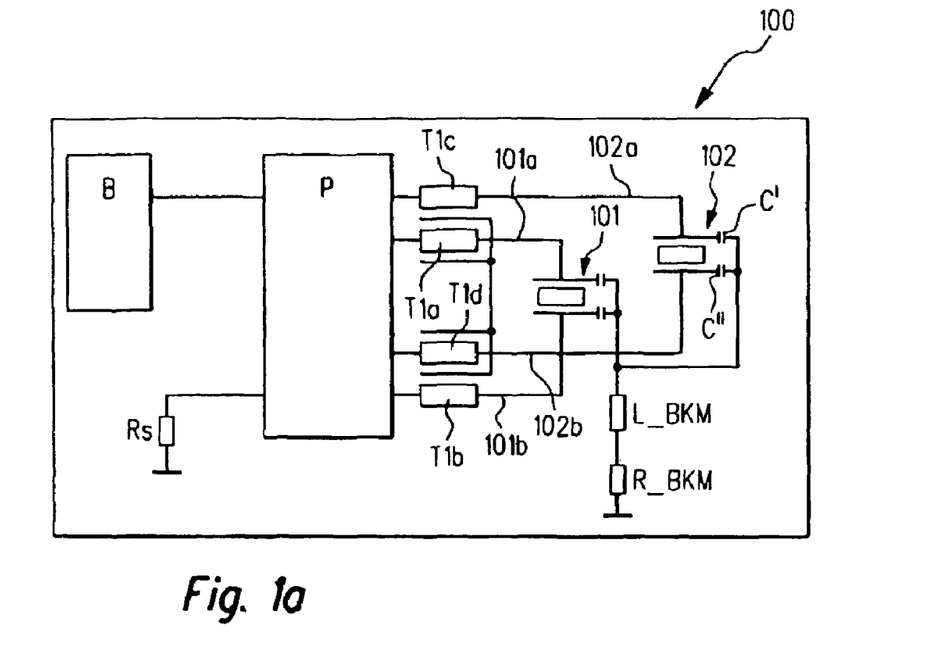
FIG. 1a illustrates an exemplary embodiment of the present invention.

FIG. 1a illustrates a control circuit 100, as it is implemented in control unit 15 of internal combustion engine 1 (FIG. 5), in which an output stage P is provided for activating piezoelectric elements 101, 102, referred to in the following as piezoelectric actuators.

Upon activation of piezoelectric actuators 101, 102, a control current flows from buffer circuit B, which stores electrical power for activation procedures, via output stage P and particular piezoelectric actuators 101, 102, back again into output stage P and via a measuring shunt Rs to ground. For this purpose, if piezoelectric actuator 101 is activated, the control current first flows via a winding T1a of an inductor provided in control circuit 100, then via piezoelectric actuator 101 and then via winding T1b of the inductor back again into output stage P. Both windings T1a, T1b are situated, like windings T1c, T1d, on the same ferrite core of the inductor.

As apparent in FIG. 1a, piezoelectric actuators 101, 102 have parasitic capacitances C', C'', which particularly form between connecting lines 101a, 101b, 102a, 102b and a vehicle ground. This state of affairs is shown in FIG. 1a using a circuit diagram, in which parasitic capacitances C', C'' of piezoelectric actuators 101, 102 are connected in series to an inductance L_BKM and an ohmic resistance R_BKM. Inductance L_BKM represents an inductance of a current path which extends from piezoelectric actuators 101, 102 to the vehicle ground; the ohmic resistance thereof is represented by R_BKM.

Therefore, an undesired resonant circuit is formed by parasitic capacitances C', C'', which have values between 500 pF and 1 nF in piezoelectric actuators 101, 102 shown, inductance L_BKM, and/or ohmic resistance R_BKM, the resonant circuit having a high quality because of the relatively low value of resistance R_BKM.

Because of a clocked activation of piezoelectric actuators 101, 102 by output stage P, in typical control circuits, i.e., in control circuits without windings T1a, T1b, T1c, T1d of the inductor shown in FIG. 1a, capacitive interference currents result from piezoelectric actuators 101, 102 via a vehicle body of internal combustion engine 1 (FIG. 5) to the vehicle ground, which induce oscillations in the resonant circuit.

Interference currents of this type may not occur, since they are damped in the manner described in the following with reference to FIG. 1d because of windings T1a, T1b, T1c, T1d of the inductor.

Figure 1B:
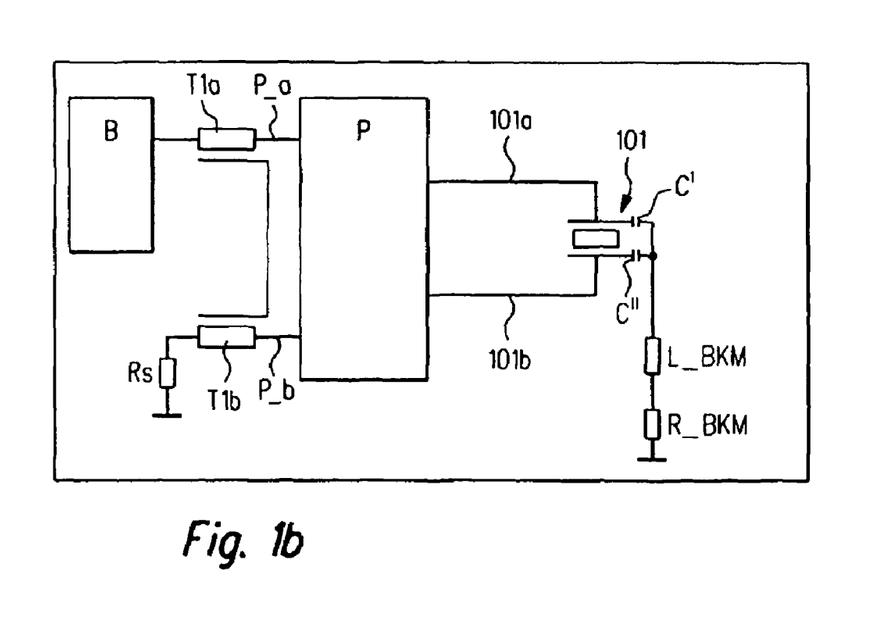
FIG. 1b illustrates an exemplary embodiment of the present invention.
Figure 1C:
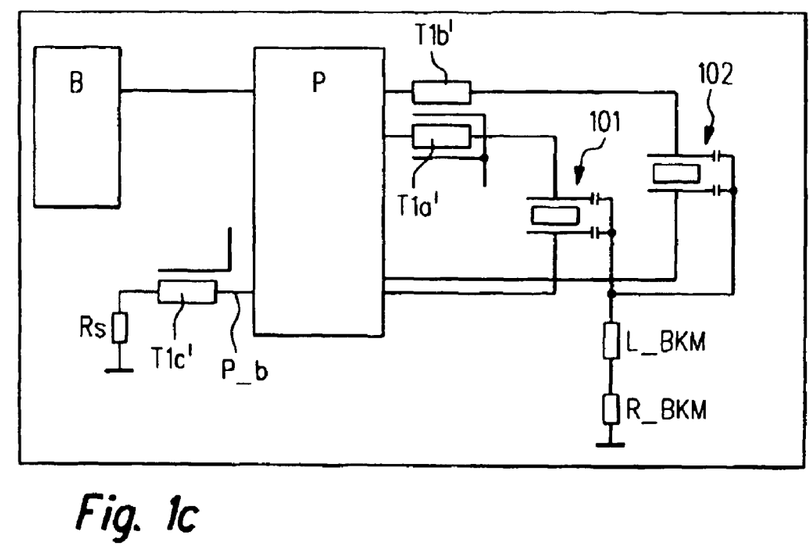
FIG. 1c illustrates an exemplary embodiment of the present invention.
Figure 1D:
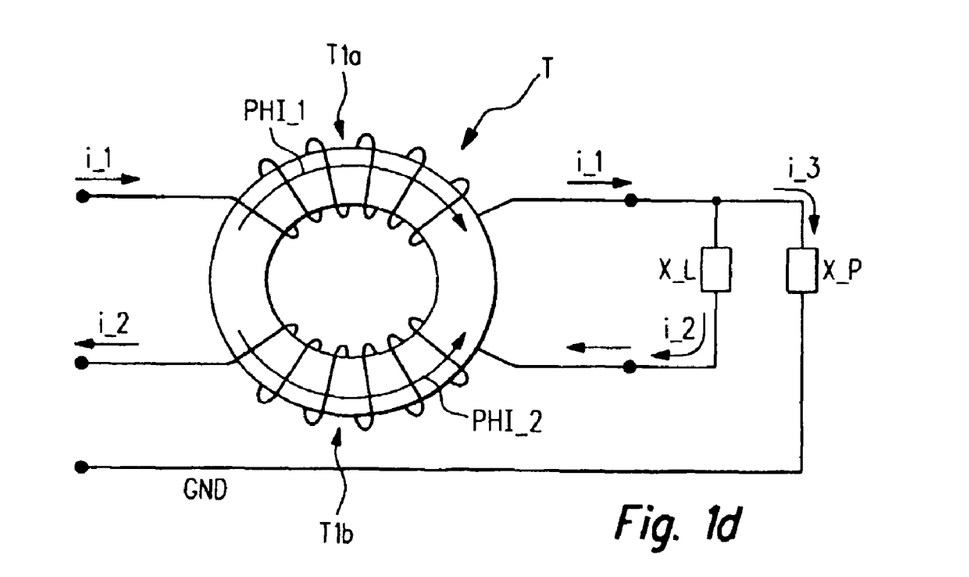
FIG. 1d is a detail illustration of an inductor according to an example embodiment of the present invention.

For this purpose, FIG. 1d shows inductor T also used in control circuit 100 illustrated FIG. 1a, of which only both windings T1a, T1b are shown in FIG. 1d for the sake of clarity. As apparent from FIG. 1d, control current i_1 originating from control circuit P (FIG. 1a) flows through winding T1a and produces magnetic flux PHI_1 in the core of inductor T indicated by the upper arrow in FIG. 1d. Upon exiting winding T1a, control current i_1 divides at the two circuit branches shown on the right in FIG. 1d. The first branch, having an impedance X_L, symbolically represents a piezoelectric actuator 101, as is shown in FIG. 1a. An impedance X_P is shown in the second branch, which represents the resonant circuit already described with reference to FIG. 1a, including parasitic capacitances C', C", inductance L_BKM, and ohmic resistance R_BKM.

Upon exiting winding T1a of inductor T, control current i_1 accordingly branches into two currents i_2 and i_3, i_2 being the control current flowing back into output stage P (FIG. 1a), and $i_{p13}$ being an interference current which flows away via parasitic capacitances C', C" and the further elements of the resonant circuit (FIG. 1a) to vehicle ground GND (FIG. 1d).

According to Kirchhoff's current law, the following equation applies for the control current flowing back into output stage P:

$$i\_2 = i\_1 - i\_3,$$

i.e., control current i_2 flowing back into output stage P is less by the value of control current i_3 than control current i_1 flowing into winding T1a of inductor T. Therefore, magnetic flux PHI_2 caused by control current i_2 in inductor T or in its core is also less by a corresponding absolute value than magnetic flux PHI_1. A compensation within inductor T therefore only occurs for a control current having absolute value i_2, but not for differential current i_=i_1−i_2. This differential current i_3, which represents the undesired interference current through parasitic capacitances C', C", is thus strongly damped by inductor T having its rated inductance. The quality of the undesired resonant current is thus significantly worsened, see X_P in FIG. 1d, so that electromagnetic oscillations produced therein no longer may result in such large electromagnetic interference levels, in particular in the engine compartment of the motor vehicle, as in control circuits without inductor T.

In order to be able to unfold the damping effect described above and simultaneously be able to achieve a compensation of control currents i_1, i_2, or magnetic fluxes PHI_1, PHI_2 caused thereby in inductor T or in its core, windings T1a, T1b of inductor T must be connected to the corresponding points of control circuit 100 (FIG. 1a) such that magnetic fluxes PHI_1, PHI_2 are directed in opposite directions. Furthermore, the number of turns of the windings is to be selected suitably.

A corresponding damping effect of interference currents affecting second piezoelectric actuator 102 in FIG. 1a is provided because of windings T1c, T1d, which operate according to the same principle and may be situated on the same core of inductor T as windings T1a, T1b.

It is also possible to provide a separate inductor for each of piezoelectric actuators 101, 102, which would each only have two windings T1a, T1b or T1c, T1d as shown in FIG. 1a.

A control circuit 100 is shown in FIG. 1b, in which inductor T has a total of two windings T1a, T1b.

The arrangement control circuit 100 illustrated in FIG. 1b may provide that even with multiple actuators, only two windings T1a, T1b are necessary to prevent interference currents through any actuator.

However, it may occur in this configuration that in control circuit P, for example, capacitive couplings to the vehicle ground may result in a corresponding interference current within output stage P, which entail a transient current via piezoelectric actuator 101, for example. The effect of inductor T is thus impaired.

In control circuit 100, which is shown in FIG. 1c, the inductor has a winding T1c' situated between output stage P and the vehicle ground or measuring shunt Rs, as well as windings T1a', T1b' situated between output stage P and each of piezoelectric actuators 101, 102. In this manner, the transient currents noted in respect to FIG. 1b through piezoelectric actuators 101, 102 may be largely avoided, because capacitive interference currents in output stage P, which still lies upstream from windings T1a', T1b in the circuit, may not act on piezoelectric actuators 101, 102, since these interference currents are damped by the inductor.

It is only possible in circuit parts of output stage P which lie between piezoelectric actuators 101, 102 and winding T1c' that interference currents flowing to the vehicle ground there, for example, may cause corresponding transient currents through piezoelectric actuators 101, 102.

The control circuit 100 shown in FIG. 1c thus represents a compromise in regard to the number of the windings of the inductor and the avoidance of transient currents through piezoelectric actuators 101, 102, because only one winding is to be provided for the inductor for each piezoelectric actuator 101, 102, as well as an additional winding T1c', which is situated between output stage P and ground.

Figure 2:
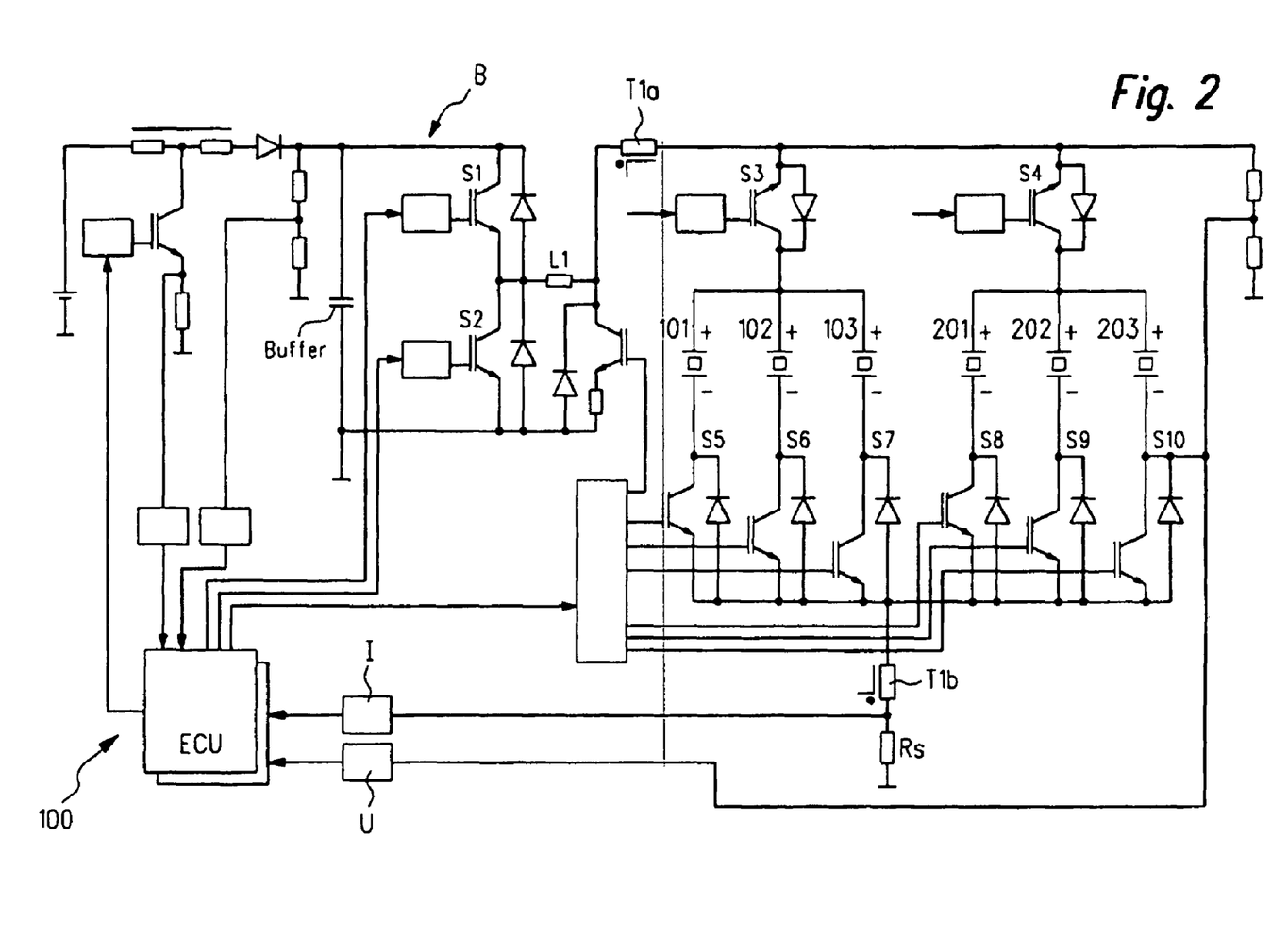
FIG. 2 illustrates a control circuit according to an example embodiment of the present invention.

FIG. 2 shows an arrangement in which a configuration of the inductor comparable to that shown in FIG. 1b is implemented.

Control circuit 100 has multiple piezoelectric actuators 101, 102, 103, 201, 202, 203, which are divided into two branches, the branches being selectable by semiconductor switches S3, S4. Furthermore, further switches S5 through S10, also designed as semiconductors, are provided, using which a specific piezoelectric actuator 101, 102, 103, 201, 202, 203 within a branch may be selected.

For example, to charge piezoelectric actuator 101, switch S5 is activated, so that after turning on charging switch S1 provided in the area of buffer circuit B, a charging current may flow via transfer inductor L1, winding T1a of inductor T (FIG. 1d), the diode of branch switch S3, and into piezoelectric actuator 101. Upon leaving piezoelectric actuator 101, the control current flows through open switch S5 through a second winding T1b of inductor T and finally through a measuring shunt Rs to ground.

Interference currents possibly arising between first winding T1a and second winding T1b of the inductor, in particular of a capacitive nature, which flow off to a vehicle ground, for example, are damped according to the principal described above with reference to FIG. 1d, but the control currents or the charging/discharging current itself are not.

For better control of the charging procedure, a clocked charging current is applied to piezoelectric actuator 101. For this purpose, charging switch S1 is turned off upon reaching a specific current value, and the energy stored in transfer inductor L1 drives the charging current further into piezoelectric actuator 101.

As soon as the charging current drops below a specific lower limit, charging switch S1 is turned on again and the charging current may rise again. Overall, a substantially triangular current flow results over time through this procedure.

As soon as a voltage established by a voltage monitoring unit U and analyzed in control electronics ECU has been reached across piezoelectric actuator 101, the charging procedure is ended by closing charging switch S1. It is possible to detect the charging current via current monitoring unit I.

To discharge piezoelectric actuator 101, corresponding branch switch S3 and discharging switch S2 are activated, so that a discharging current may flow through the diode provided on switch S5 via piezoelectric actuator 101, activated branch switch S3, and finally via discharging switch S2. The currents flowing through windings T1a, T1b of the inductor also compensate one another here, so that interference currents of the type described above may also be damped or prevented during discharging, but the discharging current itself is not impaired by the inductor.

If a current flows through transfer inductor L1, a magnetic field builds up, in which energy is accumulated. As soon as the discharging current exceeds a lower limit, discharging switch S2 is turned off, whereby the voltage across transfer inductor L1 rises above a voltage across buffer capacitor Buffer, so that finally a current flow occurs from transfer inductor L1 into buffer capacitor Buffer. Most of the electrical energy already used for charging piezoelectric actuator 101 is thus reclaimed and stored again for future activations of piezoelectric actuators 101, 102, 103, 201, 202, 203. The curve of the discharging current over time is also substantially triangular.

The mode of operation of the control circuit is shown in FIGS. 3a through 3d.

Figure 3A:
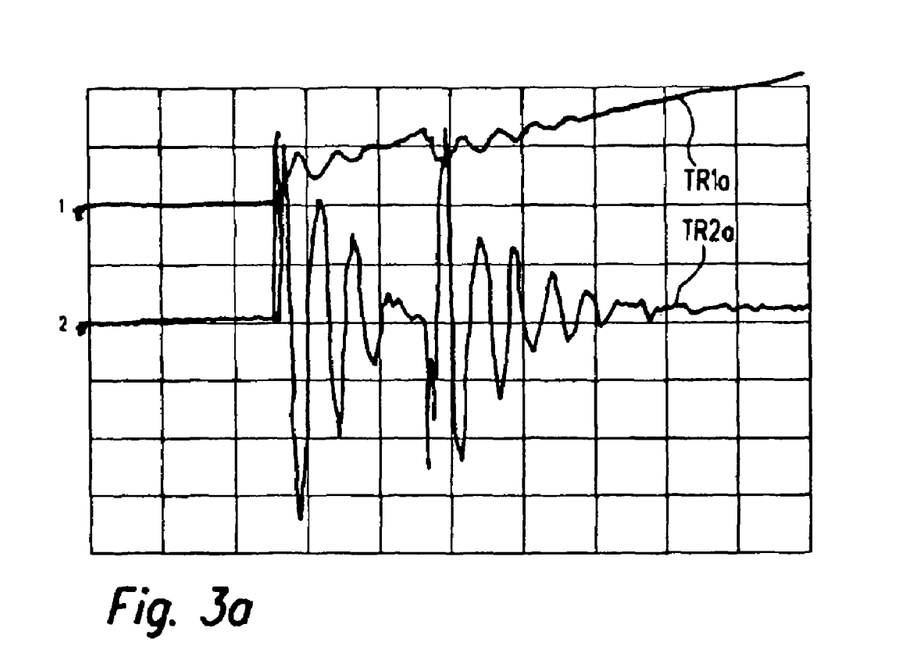
FIGS. 3a to 3d illustrate measurement results of measurements in the time range to illustrate a mode of operation of the control circuit according to an example embodiment of the present invention.

FIG. 3a shows a first signal TR1a, which corresponds to the control voltage of a piezoelectric actuator actuating fuel injector 9 of internal combustion engine 1 schematically shown in FIG. 5. Signal TR2a shows a corresponding interference voltage resulting because of the interference currents described above between a cylinder head and the vehicle body of the motor vehicle. However, a control circuit without the inductor hereof is used for these measurements. The vertical resolution is 20 V/division for signal TR1a and 1 V/division for signal TR2a; both signals TR1a, TR2a have the same time base of 2 µs/division.

It is apparent from FIG. 3a that without damping of the interference currents using an inductor, the interference voltage represented by signal TR2a may assume peak-to-peak voltage values of up to 6 volts.

Figure 3B:
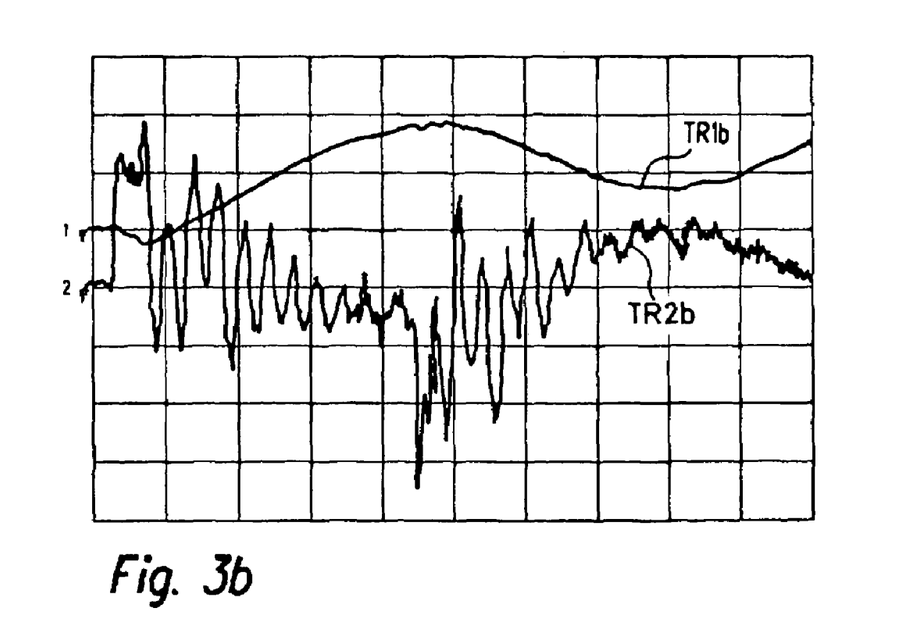

In FIG. 3b, signal TR1b represents a control voltage of fuel injector 9 (20 V/division, 1 µs/division) and signal TR2b represents the interference voltage between the cylinder head and the vehicle body (100 mV/division, 1 µs/division), which only assumes a peak-to-peak voltage of approximately 400 mV if the inductor hereof is situated between output stage P and piezoelectric actuators 101, 102, 103, 201, 202, 203 (FIG. 1a).

Figure 3C:
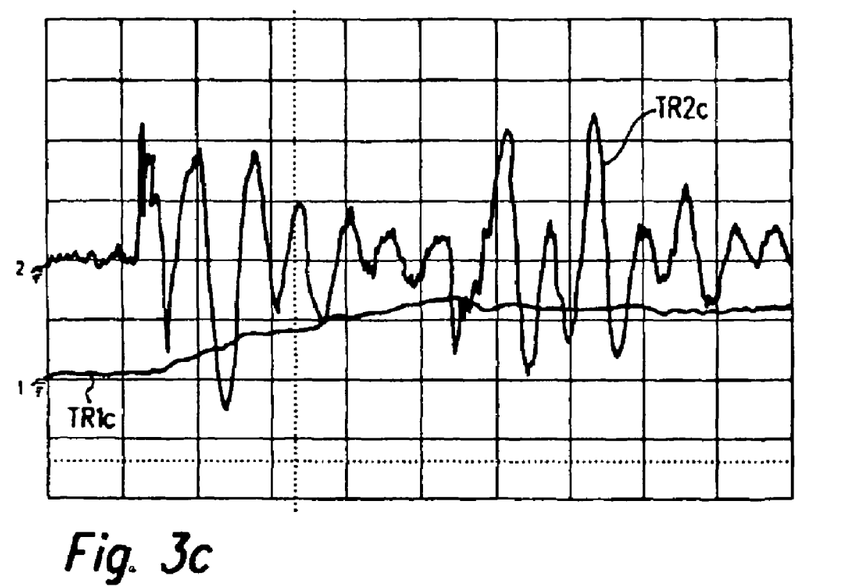
Figure 3D:
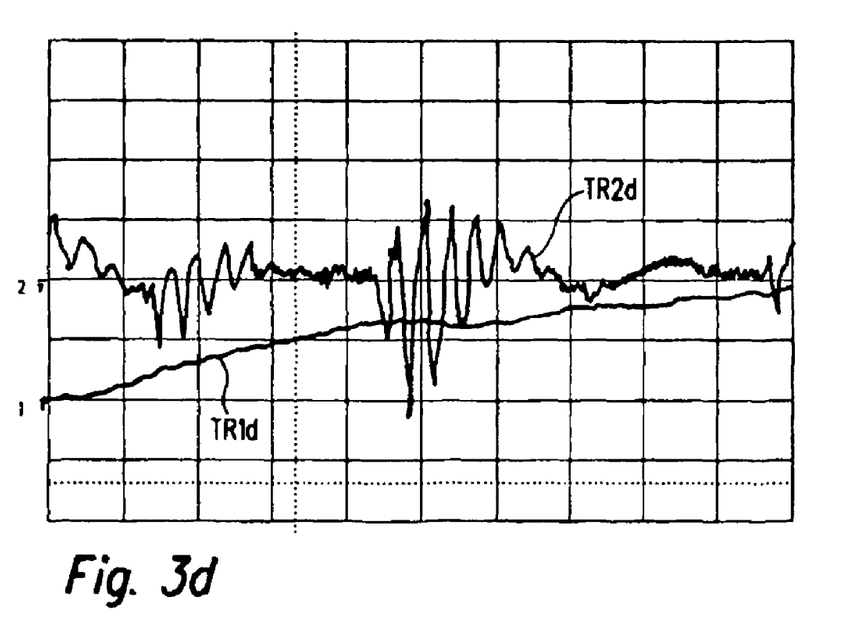

A circuit configuration of control circuit 100 having the inductor according to FIG. 1b provides the measurement results shown in FIG. 3c, in which signal TR1c again represents a control voltage of the fuel injector (20 V/division, 1 µs/division) and signal TR2c represents an interference voltage between the cylinder head and the vehicle body (200 mV/division, 1 µs/division) having a peak-to-peak voltage of approximately 800 mV.

From a comparison of the measurement results according to FIGS. 3b and 3c, it is apparent that the circuit configuration according to FIG. 1b, having only two windings, on which the measurement results of FIG. 3c are based, only offers a slightly worsened damping of interference voltages in comparison to the relatively complex approach according to. FIG. 1a, in which two windings are provided for each piezoelectric actuator 101, 102, 103, 201, 202, 203.

An arrangement of the windings of the inductor according to FIG. 1c provides the measurement results shown in FIG. 3d, signal TR1d again representing the control voltage of fuel injector 9 (20 V/division, 1 µs/division) and signal TR2d representing the interference voltage between the cylinder head and the vehicle body (200 mV/division, 1 µs/division). A value of approximately 600 mV may be read as the peak-to-peak voltage of interference voltage TR2d from FIG. 3d.

Overall, if control circuit 100 having an inductor hereof is used, significantly improved suppression of electromagnetic interference in the engine compartment results compared to typical control circuits without damping of interference currents or interference voltages resulting therefrom.

Figure 4A:
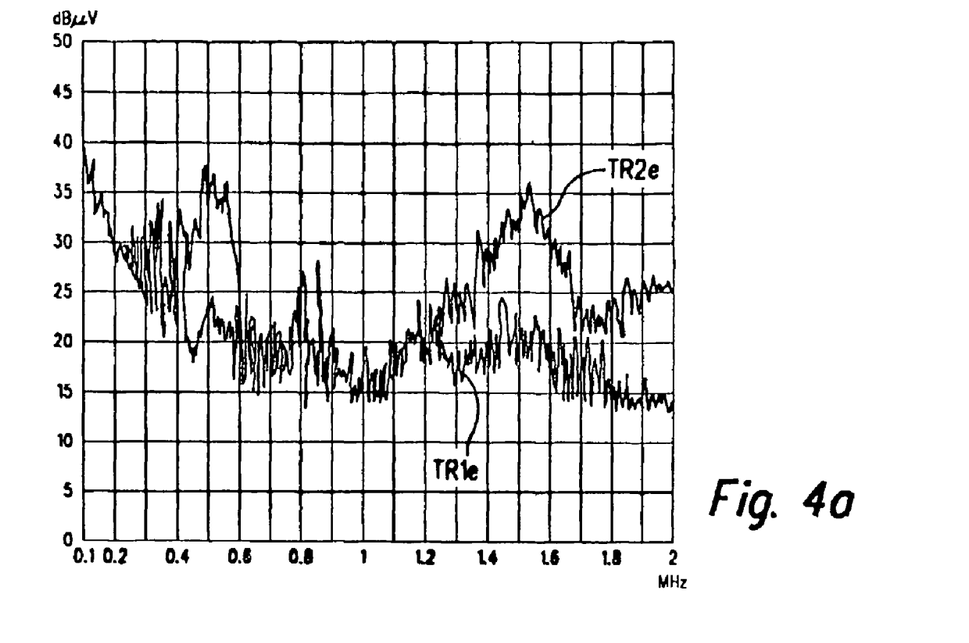
FIGS. 4a to 4c illustrate measurement results of measurements in the frequency range to illustrate the mode of operation of the control circuit according to an example embodiment of the present invention.
Figure 4B:
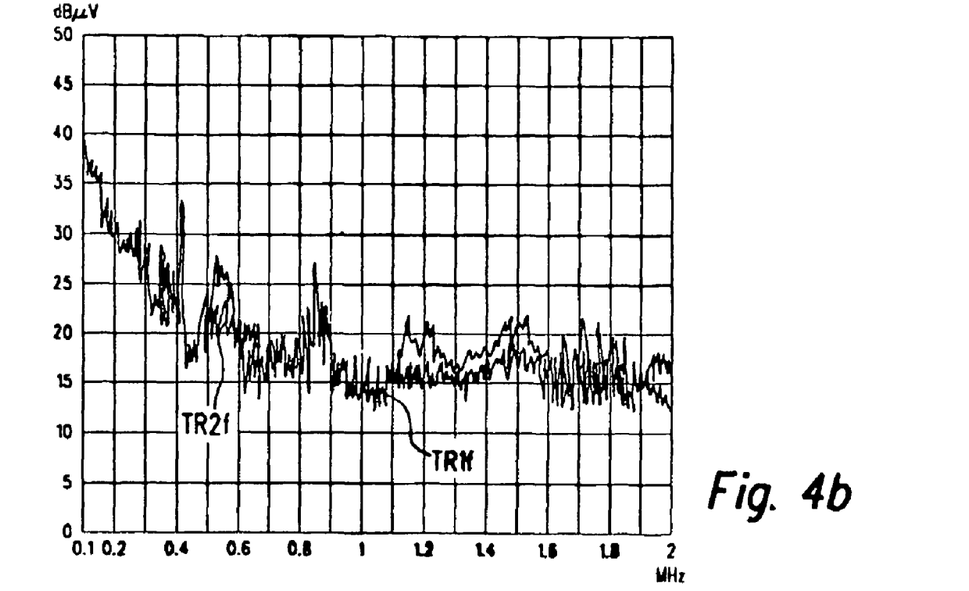
Figure 4C:
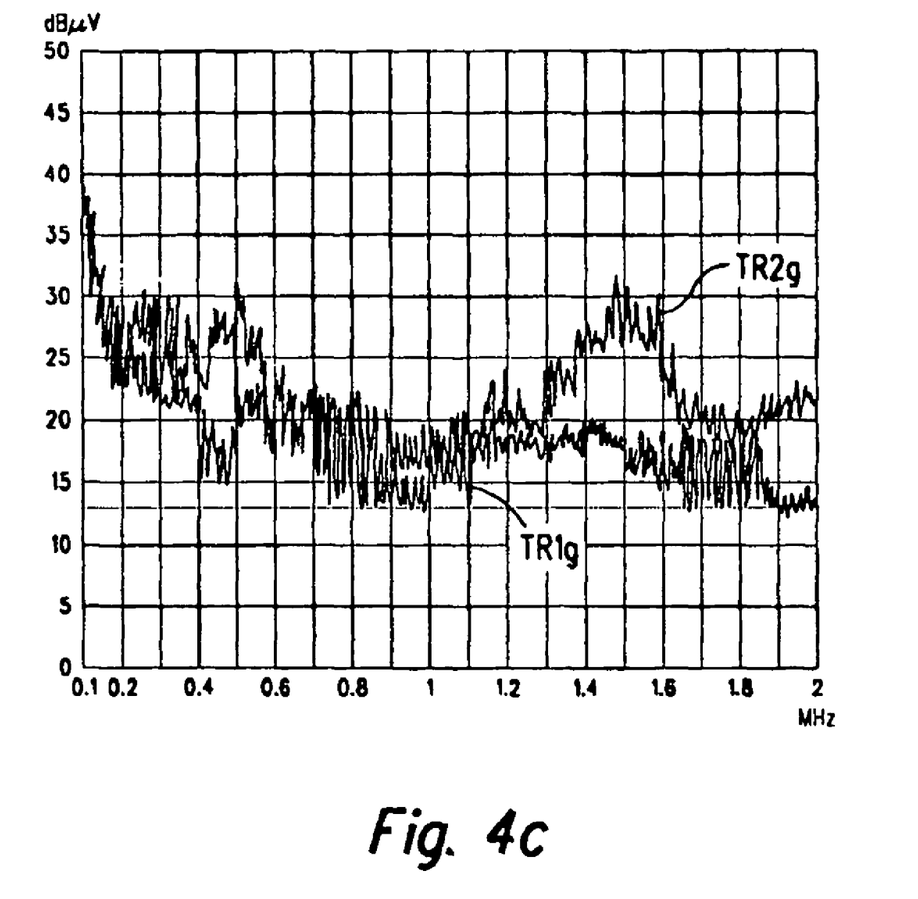

FIGS. 4a to 4c represent measurement results of measurements in the frequency range, each of which is performed using an antenna of the vehicle. A measured interference amplitude is specified in all three figures with and without the inductor hereof, the frequency scale extending from 0 to 2 MHz and the scale for the voltage level extending from 0 to 50 dBµV in each case.

It is apparent from FIG. 4a that in particular in a frequency range of approximately 0.5 MHz and of approximately 1.5 MHz as well as at frequencies greater than 1.8 MHz, significantly lower interference voltages result according to signal TR1e in comparison to an interference voltage TR2e without the system having the inductor.

The measurement results from FIG. 4a correspond to a circuit system according to FIG. 1a.

The measurement results according to FIG. 4b show the interference voltage ratios in a control circuit 100 implemented according to FIG. 1b. A lower interference voltage TR2f may also be recognized in comparison to original signal TR1f.

FIG. 4c shows the measurement results that are obtained in a circuit system according to FIG. 1c, a significantly lower interference voltage TR1g being recognizable in particular in the frequency range around 1.5 MHz and above 1.8 MHz in relation to interference voltage TR2g without the damping measures using the inductor hereof.

Overall, the measurement results of the measurements in the frequency range according to FIGS. 4a to 4c show that the interference emissions because of the interference currents may be reduced by up to 15 dBµV by the use of an inductor hereof.

Windings of the inductor may be provided for measurement purposes, which are usable in particular for detecting a magnetic flux appearing in the inductor or in its core. In this manner, interference currents that occur are recognizable and a corresponding error may be input in an error memory of control unit 15, for example.

What is claimed is:

1. A control circuit for at least one actuator, in which a control current is appliable to the actuator, comprising:
    an inductor including multiple windings, the windings implemented and connected to the control circuit such that a control current flowing into the actuator and a control current flowing out of the actuator each flow through different windings of the inductor, and a magnetic flux induced in one of (a) the inductor and (b) a core of the inductor by the control current flowing into the actuator and a magnetic flux induced in one of (a) the inductor and (b) the core of the inductor by the control current flowing out of the actuator mutually compensate each other.

2. The control circuit according to claim 1, wherein the actuator is arranged as a capacitive actuator of an injection system of an internal combustion engine.

3. The control circuit according to claim 1, wherein the inductor includes a core.

4. The control circuit according to claim 1, wherein the winding is connected directly to a connecting line =of the actuator.

5. The control circuit according to claim 1, wherein the windings are connected directly to connecting lines of an output stage configured to activate the actuator.

6. The control circuit according to claim 1, wherein at least one winding is connected directly to a connecting line of the actuator and at least one winding is connected directly to a connecting line of an output stage configured to activate the actuator.

7. The control circuit according to claim 1, wherein the core of the inductor is arranged as a ferrite core.

8. An injection system for an internal combustion engine, comprising:
- a control circuit for at least one actuator, in which a control current is appliable to the actuator, the control circuit including:
  - an inductor including multiple windings, the windings implemented and connected to the control circuit such that a control current flowing into the actuator and a control current flowing out of the actuator each flow through different windings of the inductor, and a magnetic flux induced in one of (a) the inductor and (b) a core of the inductor by the control current flowing into the actuator and a magnetic flux induced in one of (a) the inductor and (b) the core of the inductor by the control current flowing out of the actuator mutually compensate each other.

9. An internal combustion engine, comprising:
- a control circuit for at least one actuator, in which a control current is appliable to the actuator, the control circuit including:
  - an inductor including multiple windings, the windings implemented and connected to the control circuit such that a control current flowing into the actuator and a control current flowing out of the actuator each flow through different windings of the inductor, and a magnetic flux induced in one of (a) the inductor and (b) a core of the inductor by the control current flowing into the actuator and a magnetic flux induced in one of (a) the inductor and (b) the core of the inductor by the control current flowing out of the actuator mutually compensate each other.

\* \* \* \* \*